US006218782B1

United States Patent
Mallalieu

(10) Patent No.: US 6,218,782 B1
(45) Date of Patent: Apr. 17, 2001

(54) FLUORESCENT LIGHTING ASSEMBLY WITH WIRELESS BALLAST

(76) Inventor: John Mallalieu, P.O. Box 427, Basseterre (KN)

( * ) Notice: Subject to any disclaimer, the term of this patent is extended or adjusted under 35 U.S.C. 154(b) by 0 days.

(21) Appl. No.: 09/597,019

(22) Filed: Jun. 20, 2000

Related U.S. Application Data

(63) Continuation-in-part of application No. 09/185,530, filed on Nov. 4, 1998, now abandoned.

(51) Int. Cl.[7] .................................................. H01J 7/44
(52) U.S. Cl. .................. 315/56; 315/209 R; 315/DIG. 1; 362/260; 362/221
(58) Field of Search ................................. 315/56, 209 R, 315/DIG. 1; 362/220, 221, 225, 260

(56) References Cited

U.S. PATENT DOCUMENTS

| | | | |
|---|---|---|---|
| 3,673,402 | * | 6/1972 | Weiss ............................. 240/51.11 R |
| 4,144,462 | * | 3/1979 | Sieron et al. ......................... 307/66 |
| 4,504,891 | * | 3/1985 | Mazis ................................... 362/219 |
| 5,434,478 | * | 7/1995 | Kovalsky et al. ............... 315/209 R |
| 5,907,218 | * | 5/1999 | Altman et al. .......................... 315/56 |
| 6,048,220 | * | 4/2000 | Altman et al. ....................... 439/235 |

\* cited by examiner

*Primary Examiner*—Don Wong
*Assistant Examiner*—Tuyet T. Vo
(74) *Attorney, Agent, or Firm*—Glenn E. Gold

(57) ABSTRACT

A fluorescent lighting assembly includes an electrically conductive lighting fixture (10) having an electrical socket bar (20), a wireless ballast (30) having lamp circuitry, and lamp receiving sockets (28) mounted thereon. The assembly is adapted for lighting one or more fluorescent lamps (14). In operation, current driven through each fluorescent lamp is returned to the ballast via the fixture. The assembly includes ballast safety circuitry for preventing both electrical shock upon contact with the assembly and risk of fire due to a poor electrical joint within the lamp circuitry.

8 Claims, 4 Drawing Sheets

FLUORESCENT LIGHTING ASSEMBLY WITH WIRELESS BALLAST

CROSS REFERENCE TO RELATED APPLICATION

This application is a continuation-in-part of application Ser. No. 09/185,530 filed on Nov. 4, 1998 now abandoned.

FIELD OF THE INVENTION

This invention relates generally to electrical lighting assemblies, and more particularly to an improved fluorescent lighting assembly utilizing the fixture for transferring current between electronic ballast and lamp components of the assembly.

BACKGROUND OF THE INVENTION

Fluorescent lighting assemblies are well known and their use has been well established. Conventional fluorescent lighting assemblies, such as the prior art assembly depicted in FIG. 1, include a plurality of fluorescent lamps mounted in a lighting fixture, wherein opposite ends of each lamp are electrically connected via conductive wires to one or more electronic ballast subassemblies. Generally, energizing current from the ballast is directed to a first end of each lamp through a first set of wires, and subsequently returned to the ballast from a second end of each lamp through a second set of wires.

As the popularity of fluorescent lighting assemblies has increased in recent years, manufacturers and designers have strived to reduce the costs associated with lighting assembly production. In particular, these efforts have focused primarily on reducing the manufacturing cost of the electronic ballast sub-assembly. Consequently, only limited attention has been directed toward cost reduction of other components of such assemblies.

U.S. Pat. No. 5,907,128 to Altman et al. discloses a fluorescent lighting assembly having a simplified wiring arrangement aimed at reducing the labor associated with installation of the electronic ballast. More specifically, Altman et al. disclose a lighting assembly wherein each lamp has one end connected to a ballast socket, and an opposite second end electrically connected to the second end of an adjacent lamp through a common socket connector. Consequently, the disclosed assembly requires the return of electrical current to the ballast via one of each pair of lamps. Although the assembly disclosed by Altman results in a reduced wiring requirement, it has inherent limitations. For instance, the disclosed assembly incorporates specially designed electrical connectors for electrically shorting the adjacent remote lamp ends. In an alternate embodiment, Altman discloses the use of conventional sockets in lieu of the specially designed connector. However, in that instance connection of adjacent connector pairs requires conventional wiring. A further limitation results from the disclosed electrical configuration in which current is returned to the ballast via the fluorescent lamps. Namely, the required lamp pairing configuration limits the use of the disclosed assembly to mounting an even quantity of fluorescent lamps.

Accordingly, there is a well-established need for a fluorescent lighting assembly having a reduced wiring requirement which overcomes the limitations of known lighting assemblies.

SUMMARY OF THE INVENTION

It is an object of the present invention to provide a fluorescent lighting assembly incorporating wireless electronic connection between electronic ballast and fluorescent lamp components of the assembly.

It is another object of the present invention to provide a fluorescent lighting assembly in which current flowing from the ballast to the fluorescent lamps is returned to the ballast via the assembly fixture.

It is a further object of the present invention to provide a fluorescent lighting assembly incorporating electrical circuitry for minimizing the risk of electrical shock during human contact with the assembly, and for minimizing the risk of fire in the event of excessive heating at an electrical connection within the lamp circuit due to a high resistance electrical contact.

These and other objects are achieved by the present invention in which conventional fluorescent lamps 14, an electrical socket bar 20, an electronic ballast 30, and lamp-receiving electrical sockets 28 are mounted on the electrical conductive inner surface 12 of a troffer 11. Preferably, the lighting assembly 10 is designed for use with conventional off-the-shelf tubular fluorescent lamps having pairs of conventional contact pins 17, 19 extending from opposite first and second ends 16, 18 of each lamp.

In the preferred embodiment of the invention, socket bar 20 includes both conventional lamp sockets 22 configured for receiving standard fluorescent lamp contact pins 17, and ballast sockets 24 for electrically coupling the internal lamp ballasting circuitry to the socket bar. Furthermore, the socket bar preferably includes power supply sockets 26 for electrically coupling input power supply wires 42 to internal ballast wires 31 electrically connected to ballast inverter circuitry 32. The socket bar 20 is provided with pre-wired electrical connections 25 between the ballast sockets 24 and the lamp sockets 22. Wire leads 42 extend from one end of the socket bar for connection to an external power supply 40, such as a conventional source of 120 VAC or 277 VAC power commonly used in lighting circuits, and terminate at ballast power supply sockets 26.

A second plurality of conventional fluorescent lamp sockets 28 are provided mechanically mounted at an opposite end of the troffer 11. These lamp sockets 28 are configured and positioned for receiving contact pins 19 extending from the second end 18 of fluorescent lamp 14. Significantly, each of the lamp sockets 28 is electrically grounded to conductive surface 12 of troffer 11. In this manner, current traveling through lamp pins 19 is returned to lamp ballasting circuitry 34 contained in electronic ballast 30 via the fixture 10. Preferably, the sockets are electrically connected in series such that only one lamp socket has to be grounded to the fixture. The directly grounded lamp socket is grounded to the fixture using a self-tapping screw. Alternatively, the sockets 28 can be combined in a unitary structure such as the socket bar 20 mounted at the opposite end of troffer 11.

Referring now to FIGS. 3 and 5, the electronic ballast 30 includes three circuits in tandem; namely, inverter circuitry 32 and lamp ballasting circuitry 34 separated by an isolating transformer 38. Furthermore, lamp ballasting circuit 34 includes a safety circuit 36 which continuously monitors the lamp circuitry for unusual lamp loads that could lead to an unsafe condition. In particular, safety circuit 36 renders the lamp circuit inoperable in instances where there is simultaneous human contact with exposed lamp pins 19 and the lighting fixture 10, or where there is an increased load due to a high resistance electrical contact.

Lamp ballasting circuit 34 is electrically grounded to conductive fixture surface 12. Preferably, electrical grounding is achieved by providing a wire lead (not shown)

attached at one end to the ballasting circuit 24 and at an opposite end to an electrically conductive ballast mounting component, such as a metal bolt (not shown), in electrical contact with surface 12.

The inverter circuitry is conventional and well known in the art. Generally, the standard alternating current (AC) voltage from power supply 40 is rectified and converted to a direct current (DC) voltage, which may be regulated or not. In the preferred embodiment of the present invention, the DC voltage is subsequently applied to a pair of power Metal Oxide Semiconductor Field Effect Transistors (MOSFETs) 54 arranged in a standard half-bridge circuit and driven by a standard off-the-shelf half bridge driver 52. The output of the half-bridge circuit is preferably on the order of about 35 KHz and is controlled by a setting on the half-bridge driver 52. This output is coupled to a standard lamp ballasting circuit 34 by an isolating transformer ($T_2$) 38 preferably of the ferrite-core type. Isolating transformer 38 electrically isolates the output of the lamp ballast circuit 34 from the input power supply 40.

Referring now to FIG. 4, in an alternate embodiment of the present invention socket bar 20 is eliminated and lamp pins 17 are directly connected to integral pin-receiving sockets in electronic ballast 30. In this alternate embodiment, the power supply 40 is directly connected to inverter circuit 32. Similarly, current travels directly from lamp ballasting circuit 34 to lamp pins 17, and is ultimately returned to the lamp ballasting circuit via troffer 11.

DETAILED DESCRIPTION OF THE PREFERRED EMBODIMENT

Figure 1:
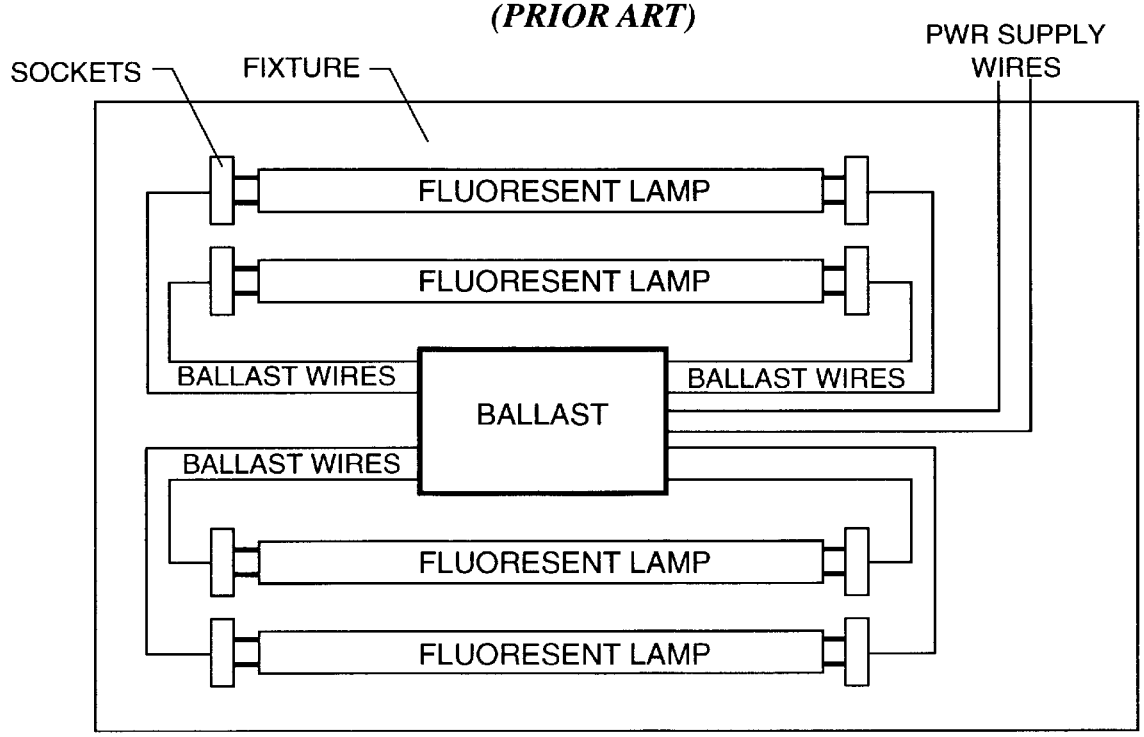
FIG. 1 is a schematic illustration of a prior art fluorescent lighting assembly.
Figure 2:
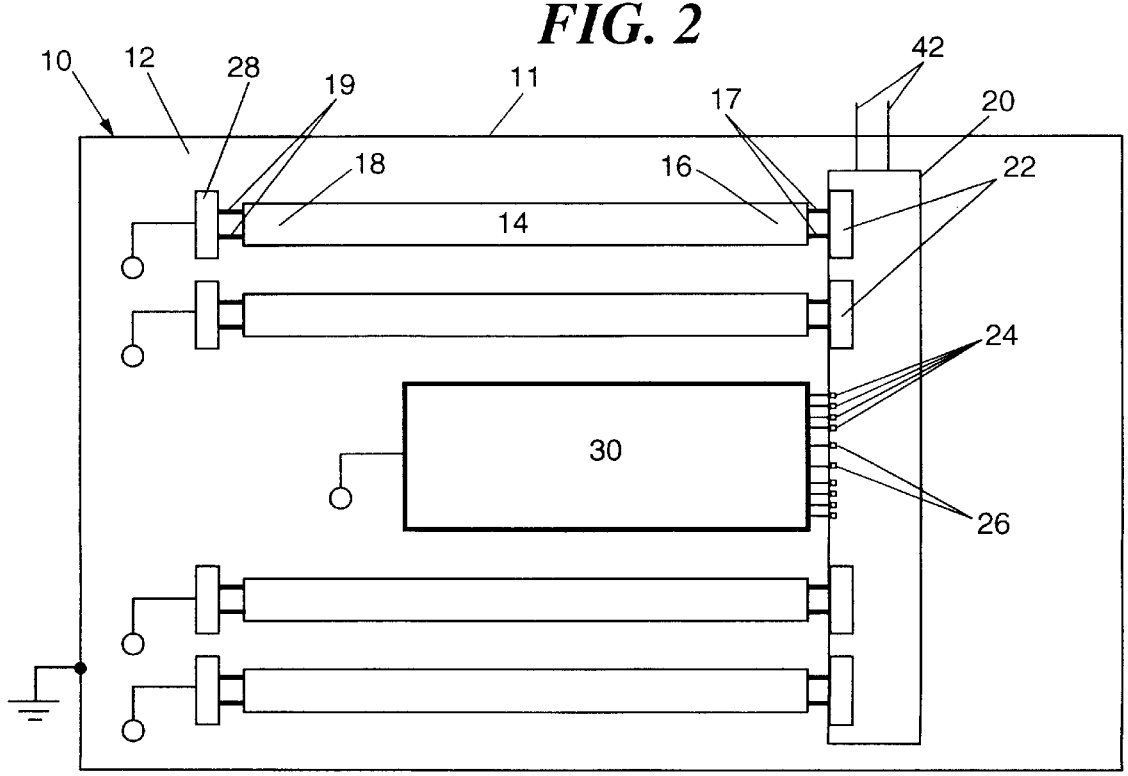
FIG. 2 is a schematic illustration of a fluorescent lighting assembly in accordance with a preferred embodiment of the present invention.
Figure 2A:
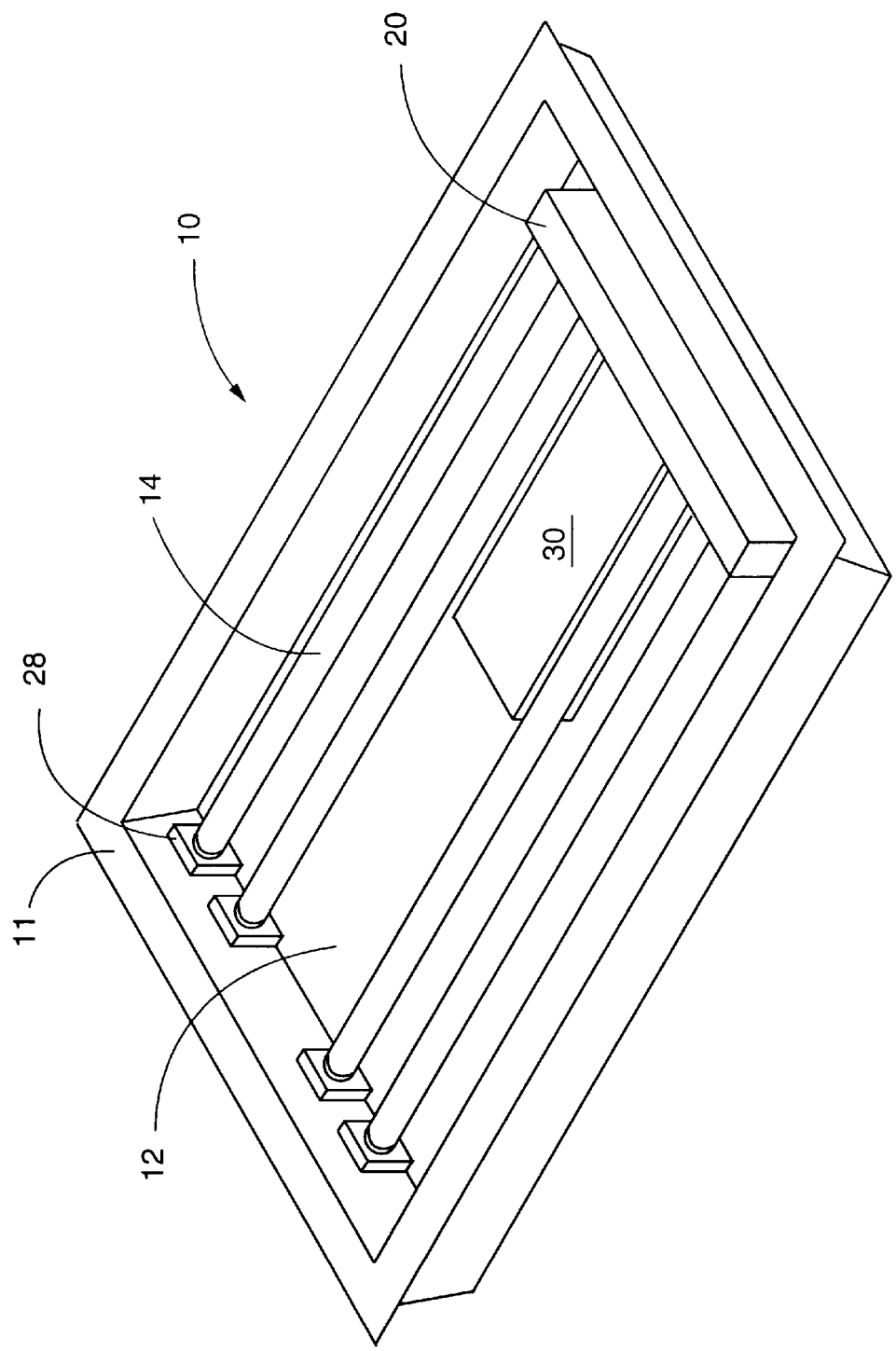
FIG. 2A is a perspective view of the fluorescent lighting assembly of FIG. 2.
Figure 3:
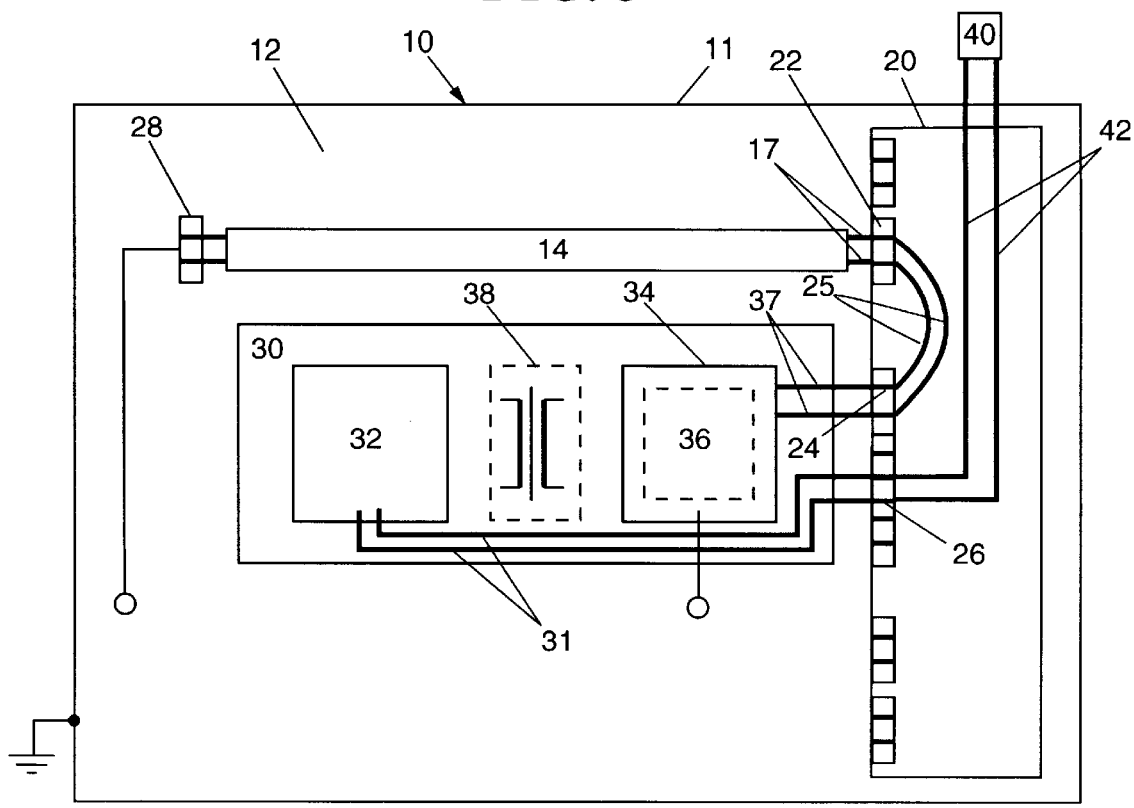
FIG. 3 is a schematic illustration of the preferred fluorescent lighting assembly depicted in FIG. 2, illustrating a preferred arrangement of ballast circuit elements.

Referring now to FIGS. 2–3, a fluorescent lighting assembly W is shown in accordance with a preferred embodiment of the invention. Generally, the lighting assembly includes the following major components: a plurality of fluorescent lamps 14; a troffer 11; an electrical socket bar 20; an electronic ballast 30; and lamp-receiving electrical sockets 28. Preferably, the lighting assembly is designed for use with conventional off-the-shelf tubular fluorescent lamps having pairs of conventional contact pins 17, 19 extending from opposite first and second ends 16, 18 of each lamp.

Troffer 11 has an electrically conductive inner surface 12 upon which the socket bar 20, electronic ballast 30, and lamp-receiving sockets 28 are mounted. In the preferred embodiment of the present invention, the lighting fixture is mounted in a ceiling. Consequently, the aforementioned mounted components depicted in the accompanying drawing figures are projected downward upon installation of the assembly. The present assembly can incorporate a variety of commercially available metal fluorescent lighting fixtures known to those skilled in the art of lighting assemblies.

Socket bar 20 is preferably mounted to the conductive inner surface 12 of troffer 11 by conventional mechanical fastening means such as screws, bolts, nuts and the like. There are a variety of commercially-available socket bars that can be used with the present invention. Such conventional electrical socket bars are well known in the lighting industry and further description is not provided herein. The socket bar 20 includes both conventional lamp sockets 22 configured for receiving standard fluorescent lamp contact pins 17, and ballast sockets 24 for electrically coupling the internal lamp ballasting circuitry to the socket bar. Furthermore, the socket bar preferably includes power supply sockets 26 for electrically coupling input power supply wires 42 to internal ballast wires 31 electrically connected to ballast inverter circuitry 32. In contrast to conventional fluorescent lighting assemblies, the ballast of the present invention is not hard-wired to the lamp sockets 22. Instead, socket bar 20 is provided with pre-wired electrical connections 25 between the ballast sockets 24 and the lamp sockets 22. Wire leads 42 extend from one end of the socket bar for connection to an external power supply 40, such as a conventional source of 120 VAC or 277 VAC power commonly used in lighting circuits, and terminate at ballast power supply sockets 26. It will be apparent to those skilled in the art that modifications to this preferred socket configuration are possible without departing from the scope of the invention. For example, electronic ballast 30 can be provided with sockets for receiving wires/connectors emanating from the socket bar 20.

A second plurality of conventional fluorescent lamp sockets 28 are provided mechanically mounted to electrically conductive surface 12 at an opposite end of lighting troffer 11. Conventional lamp sockets 28, commonly referred to in the industry as "tombstones," are configured and positioned for receiving contact pins 19 extending from the second end 18 of fluorescent lamp 14. Significantly, each of the lamp sockets 28 is electrically grounded to the conductive surface 12. In this manner, current traveling through lamp pins 19 is returned to lamp ballasting circuitry 34 contained in electronic ballast 30 via the troffer 11. Consequently, the need for a direct electrical connection structure between the lamp sockets 28 and the electronic ballast 30 is precluded. Each of the lamp sockets 28 can be directly grounded to the fixture. However, it is preferred that the sockets are electrically connected in series such that only one lamp socket has to be grounded to the fixture. Preferably, the lamp socket is grounded to the fixture using a self-tapping screw for maximizing electrical conduction between the socket and the fixture. Although lamp sockets 28 are illustrated physically isolated from one another in the accompanying drawing figures, it will be apparent to those skilled in the art that the sockets 28 can be combined in a unitary structure such as the socket bar 20 mounted at the opposite end of the troffer 11. Regardless of the mounting structure, it is critical that each of the sockets 28 is electrically grounded directly to conductive surface 12 of troffer 11, either directly or indirectly.

Figure 5:
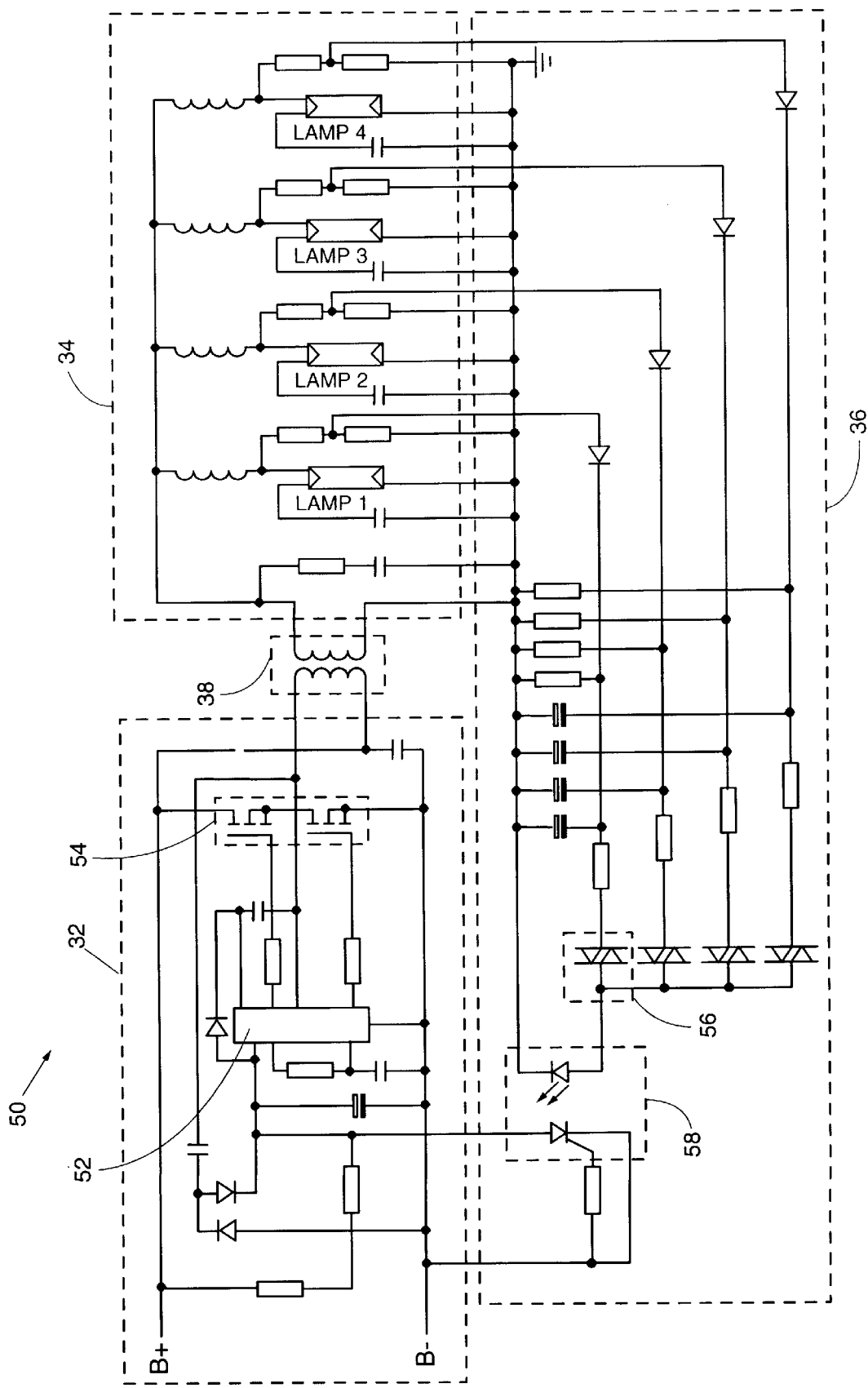
FIG. 5 is a circuit diagram of a fluorescent lighting assembly in accordance with the preferred embodiment of the present invention.

Referring now to FIGS. 3 and 5, the electronic ballast 30 includes three circuits in tandem; namely, inverter circuitry 32 and lamp ballasting circuitry 34 separated by an isolating transformer 38. Furthermore, lamp ballasting circuit 34 includes a safety circuit 36 which continuously monitors the lamp circuitry for unusual lamp loads that could lead to an unsafe condition, such as the occurrence of an electrical shock or fire, and terminates operation of the ballast where such unusual lamp loads are detected. As described in more detail below, safety circuit 36 renders the lamp circuit inoperable in instances where there is simultaneous human contact with exposed lamp pins 19 and the troffer 11, or where there is an increased load due to a high resistance electrical contact.

The electronic components of the circuits forming the electronic ballast subassembly are not shown in detail, but they would be mounted on a printed circuit board contained within the ballast housing as is well known in the art. Lamp ballasting circuit 34 is electrically grounded to conductive fixture surface 12. Preferably, electrical grounding is achieved by providing a wire lead (not shown) attached at one end to the ballasting circuit 24 and at an opposite end to an electrically conductive ballast mounting component, such as a metal bolt (not shown), in electrical contact with surface 12.

The inverter circuitry is conventional and well known in the art. Generally, the standard alternating current (AC) voltage from power supply 40 is rectified and converted to a direct current (DC) voltage, which may be regulated or not. In the preferred embodiment of the present invention, the DC voltage is subsequently applied to a pair of power Metal Oxide Semiconductor Field Effect Transistors (MOSFETs) 54 arranged in a standard half-bridge circuit and driven by a standard off-the-shelf half bridge driver 52. The output of the half-bridge circuit is preferably on the order of about 35 KHz and is controlled by a setting on the half-bridge driver 52. This output is coupled to a standard lamp ballasting circuit 34 by an isolating transformer ($T_2$) 38 preferably of the ferrite-core type. Isolating transformer 38 electrically isolates the output of the lamp ballast circuit 34 from the input power supply 40. It will be apparent to those skilled in the art that alternative inverter circuitry could be implemented without departing from the scope of the invention. For example, Bipolar transistors could be employed in lieu of MOSFETs. Furthermore, conventional push-pull circuitry could be employed in lieu of the preferred half-bridge circuitry.

The ballast subassembly of the present invention incorporates safety circuitry 36 to prevent a number of situations which could potentially result in human injury. Generally, the safety circuitry prevents the potential for injury during situations wherein current flow through the assembly circuitry is impeded for one reason or another. In particular, the safety circuitry ensures that no electrically conductive portions of the lighting assembly ever achieve an electrical potential, with respect to electrical ground, such that the electrical potential difference is sufficient to pose an electrical shock hazard. In this manner, the safety circuitry ensures that the electrical potential difference between the lamp pins and the fixture is maintained below a level which could result in risk of electrical shock during lamp replacement. The safety circuitry also prevents the occurrence of another hazardous condition which can result in instances where there is a corrosive buildup at lamp pin-to-socket connections which impede the flow of current through the lamp circuit. In this instance, irregular ignition of the ionizing gas within a lamp could result in an explosion. This condition is commonly referred to in the lighting industry as an "end-of-life" condition.

Although the present lighting assembly is adapted for use with multiple fluorescent lamps, for the sake of simplifying the following discussion reference will be made to a single circuit for powering a single fluorescent lamp 14 (denoted $Lamp_1$ in the circuit diagram of FIG. 5). Prior to lamp ignition, there is no current traveling through the assembly. Consequently, $L_3$ and $Ct_1$ are in electrical series with each other. This inductor-capacitor pair is tuned to a resonant frequency equal to the output of the half-bridge driver chip 52. When power is turned on, because of resonance, the voltage across $Ct_1$ is adequate to ignite $Lamp_1$. Upon ignition, $Lamp_1$ is shunting the capacitor; consequently, the voltage across $Ct_1$ falls to a level significantly lower than its initial level, yet high enough to maintain ignition of the lamp.

The function of the preferred safety circuitry 36 will now be described by reference to an exemplary hazardous scenario. During an improper installation or removal of $Lamp_1$, second lamp end 18 may be removed from socket 28 while first lamp end 16 is still electrically connected to socket 22. Absent a shut down circuit, electrical components $L_3$ and $Ct_1$ are electrically connected in series and, without a lamp load physically connected across $Ct_1$, the voltage across $Ct_1$ will remain excessively high. The integral safety circuit 36 automatically halts operation of the ballast under such conditions by terminating the drive to its switching circuit. For example, in the preferred embodiment of the invention the voltage across the capacitor $Ct_1$ is monitored by the detection circuitry such that, upon detection of a predetermined voltage increase, the circuit is shut down. In particular, when diac 56 detects an unsafe voltage, it passes the voltage on to a photodiode within optoisolator 58. In turn, the optoisolator 58 triggers a silicon-controlled rectifier (SCR) component of the optoisolator which grounds the Vcc lead of the driver chip 52 to the B- bus, thereby shutting down the driver chip.

Figure 4:
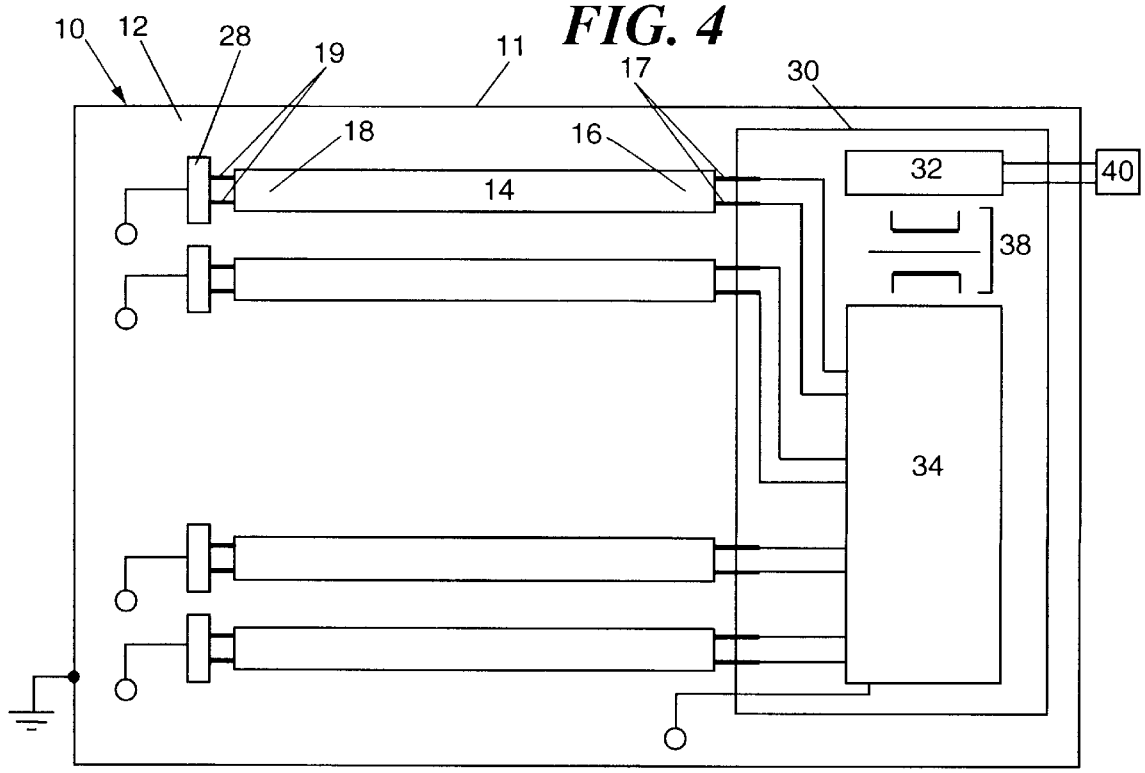
FIG. 4 is a schematic illustration of a florescent lighting assembly in accordance with an alternate embodiment of the present invention.

Referring now to FIG. 4, in an alternate embodiment of the present invention socket bar 20 is eliminated and lamp pins 17 are directly connected to integral pin-receiving sockets in electronic ballast 30. In this alternate embodiment, the power supply 40 is directly connected to inverter circuit 32. Similarly, current travels directly from lamp ballasting circuit 34 to lamp pins 17, and is ultimately returned to the lamp ballasting circuit through the troffer 11.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

I claim:

1. A lighting fixture assembly, comprising:
   a troffer having an electrically conductive surface;
   first and second electrical sockets mounted on the electrically conductive surface of said troffer and positioned for supporting a fluorescent lamp therebetween,
   an electronic ballast mounted on the electrically conductive surface of said troffer and including lamp ballasting circuitry, said lamp ballasting circuitry electrically connected to the first pair of lamp pins via the first electrical socket and electrically grounded to the conductive troffer surface,
   the second pair of lamp pins electrically connected to the conductive surface of the troffer via said second electrical socket,
   said troffer providing an electrically conductive path back to said lamp ballasting circuitry.

2. A lighting assembly as recited in claim 1, further comprising a socket bar for providing Said electrical coupling between said lamp ballasting circuitry and said first sockets.

3. A lighting assembly as recited in claim 1, wherein said first electrical socket is integral to said electronic ballast such that said at least one fluorescent lamp is electrically coupled directly to said electronic ballast.

4. A lighting assembly as recited in claim 1, wherein said electronic ballast further comprises safety circuitry for halting operation of said electronic ballast under predefined hazardous electrical conditions.

5. A method for powering a lamp component of a fluorescent lamp assembly as recited in claim 1, the method comprising the steps of:

provide an electric current to said electronic ballast;

subjecting the electric current to said lamp ballasting circuitry;

transmitting the electric current through said lamp, via said first electrical socket, to said second electrical socket;

transmitting the electric current through the negative terminal of said second electrical socket to the electrically conductive surface of said troffer; and transmitting the electric current exiting the negative terminal of said second socket back to said ballast via said electrically conductive troffer surface.

6. A method as recited in claim 5, further comprising the step of monitoring the voltage across a portion of said ballast circuitry to determine the existence of an unsafe condition.

7. A method as recited in claim 6, wherein said step of monitoring further comprises monitoring the voltage across an electrical capacitor component of said ballast circuitry.

8. A method as recited in claim 6, further comprising the step of halting operation of said electronic ballast upon detection of a predetermined voltage during the step of monitoring the voltage.

* * * * *